(12) United States Patent
Villarin

(10) Patent No.: US 6,639,330 B2
(45) Date of Patent: Oct. 28, 2003

(54) TRANSFER RELAY FOR COMPUTER BASED EQUIPMENT

(76) Inventor: Nilo Villarin, 11300 Seneca View Way, Great Falls, VA (US) 22066

( * ) Notice: Subject to any disclaimer, the term of this patent is extended or adjusted under 35 U.S.C. 154(b) by 182 days.

(21) Appl. No.: 09/985,967

(22) Filed: Nov. 7, 2001

(65) Prior Publication Data

US 2003/0085623 A1 May 8, 2003

(51) Int. Cl.$^7$ .................................................. H02J 7/00
(52) U.S. Cl. ........................................................ 307/64
(58) Field of Search ............................... 307/44–46, 48, 307/52, 62, 64, 66, 71, 80, 85, 86

(56) References Cited

U.S. PATENT DOCUMENTS

| | | | | |
|---|---|---|---|---|
| 5,579,197 A | * | 11/1996 | Mengelt et al. | 361/93.4 |
| 5,903,065 A | * | 5/1999 | Dragos | 307/64 |
| 6,157,168 A | * | 12/2000 | Malik | 320/128 |
| 6,515,379 B1 | * | 2/2003 | Nojima et al. | 307/64 |

* cited by examiner

*Primary Examiner*—Matthew V. Nguyen
(74) *Attorney, Agent, or Firm*—Roland H. Shubert

(57) ABSTRACT

A power switching transfer relay is provided to automatically switch an electrical load, such as that drawn by a computer or other sensitive electrical or electronic equipment, from a primary power source to a secondary, or backup, power source upon interruption or loss of the primary source. The transfer relay includes a power relay and two control relays that are arranged to switch the electrical power input from the primary source to the backup source upon failure of the primary power source in the space of less than one cycle, and to actuate an alarm upon loss of the primary power source, loss of the backup power source, or the occurrence of a relay fault.

6 Claims, 1 Drawing Sheet

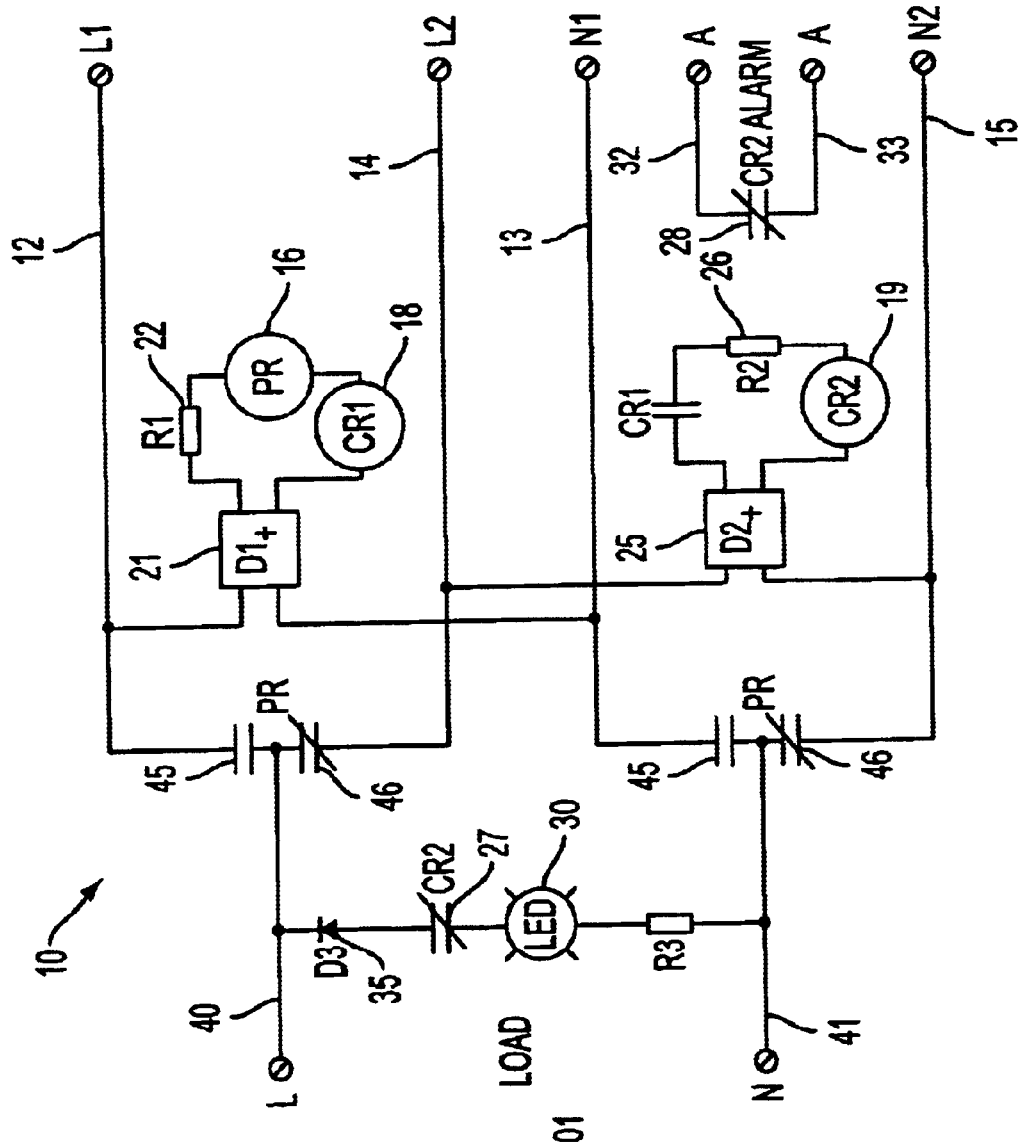

TRANSFER RELAY FOR COMPUTER BASED EQUIPMENT

BACKGROUND OF THE INVENTION

1. Technical Field

This invention relates to a power switching device that automatically switches a load from a primary power source to a secondary power source upon interruption or loss of the primary power source.

More particularly, this invention relates to a transfer relay that provides a computer installation or other critical device the capability of accepting two sources of power, one primary and one backup, so that interruption to or loss of the primary power source causes the backup source to be automatically selected.

2. Description of Related Art

It is known in the art to provide a backup power supply, or secondary source of power, to maintain a computer in operation in the event that the primary power source fails or is interrupted.

SUMMARY OF THE INVENTION

This invention provides a transfer relay that is arranged to accept an electrical power input from each of two different and independent sources, one a primary source and the other a backup source, and to provide a single power output that serves to power a computer or other device needing uninterrupted operation. Upon the loss of power from the primary source, the relay automatically switches to the backup source and completes the transfer from one source to the other in less than one cycle in a fashion that is completely transparent to the load. The device returns to the primary power source as soon as it is restored.

BRIEF DESCRIPTION OF THE DRAWING

The single FIGURE comprises a circuit diagram of the transfer device of this invention.

DESCRIPTION OF PREFERRED EMBODIMENTS OF THE INVENTION

The relay transfer device of this invention, in a preferred embodiment, includes a printed circuit board having electro-mechanical relays, rectifiers, resistors, terminal blocks and an indicating light mounted thereon, all encased within a suitable housing. The device is provided with two plug and cord sets, one for connection to a primary power source and the second for connection to a backup power source. A receptacle is provided to allow a computer or other electrical or electronic device to be plugged in for operation.

Turning now to the FIGURE, there is shown at 10 a schematic circuit diagram of the transfer device of this invention. Power is supplied to the transfer device from a primary source by way of a first line pair 12 and 13, designated on the drawing as L1 and N1, and also from a backup source by way of a second line pair 14 and 15, designated on the drawing as L2 and N2. The circuit includes a power relay 16, a first control relay 18 and a second control relay 19. All three of those relays are preferably of the electro-mechanical type in which the relay coil is powered by direct current in order to achieve a faster response time. The power supplied to the transfer device is typically 60 cycle, 120 volt alternating current, and a rectifier 21 is connected between the first line pair to provide direct current to power the coils of relays 16 and 18. A resistor 22 drops the rectifier output to the rated relay voltage. The coil of control relay 18 is wired in series with the coil of power relay 16. That arrangement makes available an additional set of contacts and also allows detection of relay coil failure thus providing additional operational safeguards.

Second control relay 19 is connected across the backup power source line pair 14 and 15. As with relays 16 and 18, the coil of control relay 19 is powered by direct current produced by rectifier 25 that is adjusted to the rated coil voltage by means of resistor 26. Relay 19 monitors the backup power source supplied by line pair 14 and 15, and when the backup source is in use, its contacts 27, 28 close to activate a signal generating means such as light emitting diode (LED) 30 and to send an alarm to a remote location by way of terminals 32 and 33. Rectifier 35 provides direct current to LED 30 while resistor 37 drops the voltage to the rated LED voltage. Rectifier 35, relay contacts 27, 28, LED 30 and resistor 37 are connected in series across load line pair 40 and 41.

The FIGURE depicts the circuit as it is configured when power is being drawn from the primary source, line pair 12 and 13 that also energizes the coils of power relay 16 and first control relay 18. Power relay 16 is provided with double pole double throw contacts 45 and 46, contact 45 being in the open position and contact 46 being closed when the primary source is energized. The coil of second control relay 19 is wired across the backup source, line pair 14 and 15, and contacts 27,28 of relay 19 are in the closed position when line pair 14 and 15 is not powered.

Upon loss of the primary source, line pair 12 and 13, the coils of power relay 16 and first control relay 18 de-energize, causing contact 46 to close and contact 45 to open. That allows current to flow from the backup source, line pair 14 and 15, to the load by way of line pair 40 and 41. Current then is also interrupted through the coil of second control relay causing contacts 27, 28 to close allowing current flow through LED 30 to provide visual warning of primary power source failure and to send an alarm to a remote location by way of terminals 32 and 33. Upon loss of the backup source provided through line pair 14 and 15 with the primary source still available, the second control relay 19 will drop closing contacts 27, 28, lighting up LED 30, and sending an alarm by way of terminals 32 and 33. The indicating light provided by LED 30 and the alarm terminals 32 and 33 are actuated under any of the three following conditions; loss of primary source, loss of backup source, and relay fault. The alarm contact is actuated if both the primary and backup sources are lost, but LED 30 will not be lit under this condition. All transfers between the primary source and the backup source are completed in less than one cycle and are transparent to the computer or other load.

Accordingly, it can be appreciated that the power source transfer relay of this invention provides a simple and effective means for avoiding the operational interruption of computers and other sensitive electrical and electronic equipment.

I claim:

1. A transfer relay having output means to supply a load that requires uninterrupted operation comprising:
   means to accept an alternating current electrical power input from two different and independent sources, one said source being a primary source and the second said source being a backup source;
   a power relay, the coil of said power relay connected across said primary source, said power relay having a pair of double pole, double throw contacts, the first pair of said contacts being in the closed position in which current flows from the primary source to the load and the second pair of said contacts being in the open position when the primary source is energized, said second pair of contacts arranged to allow current flow from said backup source to said load when said contacts are closed;

a first control relay and a second control relay, the coil of said first control relay wired in series with the coil of said power relay, said first control relay arranged with a pair of contacts that are held closed while the coil of said relay is energized, said contacts arranged to interrupt current flow to the coil of said second control relay when open and to provide means for the detection of coil failure in said power relay, the coil of said second control relay connected across a line pair from said backup source, the second control relay having contacts that are maintained in an open position when said coil is energized and, upon closing, cause said power relay to switch said electrical power input from said primary source to said backup source in less than one cycle; and alarm means that are activated upon closure of said second control relay contacts to provide warning upon failure of said primary power source.

2. The transfer relay of claim 1 wherein said power relay and said first control relay are electro-mechanical relays, wherein a rectifier is connected across said primary source, and wherein direct current produced by said rectifier energizes the coils of said power relay and said first control relay.

3. The transfer relay of claim 1 wherein said second control relay is an electro-mechanical relay, wherein a rectifier that is connected across said backup source, and wherein direct current produced by said rectifier energizes the coil of said second control relay.

4. The transfer relay of claim 1 wherein said alarm means that are activated by closure of said second control relay contacts comprise signal generating means that activate a light source at the site of said transfer relay, and also sends an alarm to a remote location.

5. The transfer relay of claim 4 wherein said light source is a light emitting diode.

6. The transfer relay of claim 1 wherein said alarm means are activated upon loss of the primary electrical power source, loss of the backup electrical power source, and by a relay fault.

* * * * *